United States Patent
Rand et al.

[11] Patent Number: 5,960,414
[45] Date of Patent: Sep. 28, 1999

[54] METHOD FOR MONITORING EXCESS INVENTORY

[75] Inventors: Christopher James Rand, Roseville; Karla Jane Peterson, San Jose, both of Calif.

[73] Assignee: Hewlett-Packard Company, Palo Alto, Calif.

[21] Appl. No.: 08/977,303

[22] Filed: Nov. 25, 1997

[51] Int. Cl.[6] .................................................. G06F 17/00
[52] U.S. Cl. ............................................ 705/28; 705/22
[58] Field of Search ........................................ 705/28, 22

[56] References Cited

U.S. PATENT DOCUMENTS 5,101,352  3/1992  Rembert ...................................... 705/8

OTHER PUBLICATIONS

Robert W. Hall, Planning Your Material Requirements, *Harvart Business Review*, Sep./Oct. 1978, p. 105.

Ann Saccomano, The Great MRP Debate, *Traffic World*, Oct. 21, 1996, p. 22.

Kevin Parker, Evolution continues in MRP II–type systems, *Manufacturing Systems*, V12 n7, pp. 32–54, Jul. 1994, ISSN: 0748948X.

*Primary Examiner*—Thomas R. Peeso

[57] ABSTRACT

An excess inventory system monitors excess material. In the system, requirements are determined for each component part over a predetermined period (e.g., 6 months) from material requirements planning (MRP) data. When forecasting for the component part is to be determined using an MRP planning method, the MRP data is used to determine a number of excess component parts. The number of excess components is then recorded in a record for the component part within an excess inventory table. When forecasting for the component part is to be determined using an alternate planning method which is alternate to MRP, the alternate planning method is used to determine a number of excess component parts. The number of excess components and a notation indicating the alternate planning method used are then recorded in the record for the component part within the excess inventory table.

22 Claims, 4 Drawing Sheets

METHOD FOR MONITORING EXCESS INVENTORY

BACKGROUND

The present invention concerns managing resources for a manufacturing process and pertains particularly to a method for calculating excess inventory.

Generally, in order to determine excess inventory for a manufacturing process, the industry procedure is to use standard material requirements planning (MRP). For example, six-month consumption requirements for a component part is determined. From this is subtracted the current material on hand balances and on order balances. If the material on hand and on order exceeds six-month requirements that material is considered in excess of requirements.

In this system all materials not using standard material requirements planning (e.g. there are no six-month requirements identified by MRP) are calculated to be 100% in excess. This can result in over-stated excess reported or accrued. That is material that is not truly excess is regarded as excess because the current calculation cannot determine the six-month requirements.

Typical inventory management is performed using spreadsheets with data collected once a month for the previous month. For more than one manufacturing organization, each manufacturing organization manually gathers data for material on hand balances, material on order quantities, direct material dispositions, dispositions against material accruals, de-accruals and material requirements for the next six months. Once the information is collected, each manufacturing organization uses spreadsheet applications to calculate the dollar and quantity excess material exposure for their organization.

One disadvantaged realized by using spreadsheets to determine excess material exposure has been the post reactive review of excess data. Since the spreadsheet applications exist outside of the materials management system all of the data has to be gathered prior to the calculations and analysis occurring. Therefore, excess analysis is performed on a post-monthly basis without the ability to make "real time" decisions regarding excess recovery or prevention.

Excess reporting for each manufacturing organization is typically generated from the spreadsheets used by the manufacturing organization. User access to the spreadsheets is often limited, for example, to excess analysts and financial analysts. Typically, a buyer of parts has access to information about excess inventory only through lists of excess material generated by an excess analyst or a financial analyst. For example, an analyst forwards listings of suspect excess material to buyers monthly for review and feedback. Once the buyers receive their excess listing they review the listing over the course of a month and note which materials are not excess. Excess analysts and/or financial analysts then incorporate the buyer's feedback into their individual spreadsheets and create listing of excess material by product family.

In the past there has existed no method to allow the systematic and controlled exclusion of material from organizational excess calculations. Instead, the excess analysts would remove or reduce dollar amounts in the spreadsheets used to calculate excess to estimate materials that they felt were not truly excess.

Typically, the finance department targets an agreed upon dollar amount for the coming year for materials expected to be disposed of. This is material that could potentially be in excess, obsolete and/or scrapped sometime during the year. An excess/obsolete inventory accrual is established for the inventory in excess and the excess or obsolescence expense recorded.

The finance department then identifies all materials previously accrued that actually have been disposed of, calculates the dollar value, and then balances this dollar amount, per month, to the targeted amount for the year. This process can be very manual and labor intensive especially when data is captured by extracting data from numerous sources before analyzing the data and then loading the data into spread sheets for further processing.

The finance department also is generally responsible to identify the year-to-date dollars spent on obsolescence, and then report this value to management. The year-to-date obsolescence dollars are calculated, for example, by identifying all accrued materials that had actually been disposed of, the dollar amount for materials accrued for but not disposed of, the dollar amount for materials not accrued for but which were disposed of and the dollar amount recovered by selling the material to another business or by returning it to the vendor. This process is typically very manual and labor intensive. The data is captured by extracting data from numerous sources, analyzing the data and then loading the data into spread sheets for further processing.

Tracking excess inventory as described above has several disadvantages. For example, there is uncontrolled access to confidential financial data. Also when manufacturing organization specific methods are used for calculating excess inventory it is difficult to accurately summarize the total excess inventory. There is also a high risk of the corruption of manufacturing organization specific data. The processes for gathering the necessary data for managing local excess inventory has been manually intensive. There has been no systematic audit tracking of excess inventory. There has also been post reactive review of excess inventory so that no proactive measure could be taken on inventory. There is also a lengthy processing time for loading manufacturing organization data in spreadsheets for excess calculations.

SUMMARY OF THE INVENTION

In accordance with the preferred embodiment of the present invention, an excess inventory system monitors excess material. In the excess inventory system, requirements are determined for each component part over a predetermined period (e.g., 6 months) from material requirements planning (MRP) data. When forecasting for the component part is to be determined using an MRP planning method, the MRP data is used to determine a number of excess component parts. The number of excess components is then recorded in a record for the component part within an excess inventory table. When forecasting for the component part is to be determined using an alternate planning method which is alternate to MRP, the alternate planning method is used to determine a number of excess component parts. The number of excess components and a notation indicating the alternate planning method used are then recorded in the record for the component part within the excess inventory table.

The forecasting and updating of the excess inventory table may be scheduled at any time after the performance of an MRP cycle. For example, this may be done monthly, weekly, daily or even hourly depending upon the frequency at which MRP data is generated.

In the preferred embodiment, when the forecasting for the component part is to be determined using the MRP planning method, the number of excess component parts is determined using the following formula:

excess component parts=number of component parts on hand+ number of component parts on order−requirements for the component part over the predetermined period.

In the preferred embodiment, each record in the excess inventory table includes an exclude code field which allows an MRP controller to remove material from being regarded as excess.

Also in the preferred embodiment, information in the excess inventory table is summarized and the summarized information is placed into a summarized excess inventory table. The summarized excess inventory table includes a record for platform products.

For example, each record in the summarized excess inventory table includes a field for maintaining actual accruals for excess materials for a platform product. A value for the current actual accruals placed in the field is calculated using the following formula:

current actual accruals=((last period actual accruals+new accruals)−de-accruals)−dispositions against accruals.

Also, each record in the summarized excess inventory table includes a field for maintaining year-to-date (YTD) obsolescence value for excess materials for the platform product. A value for the current YTD obsolescence value placed in the field is calculated using the following formula:

YTD obsolescence value=((last period YTD obsolescence value+ actual accruals)−de-accruals)−direct dispositions−recovery dollars.

The present invention has many advantages over prior art systems. For example, the excess inventory system provides for accurate reporting of excess material exposure with multiple planning methods. The excess inventory system allows for flexibility and scalability for excess calculations when different manufacturing organizations use or may use different planning methods. Record stamping is provided which indicates what method of planning and which calculation was used to determine material excess exposure. This facilitates identification and record searching for materials calculated with an alternative planning method.

Flexibility in planning cycle (monthly, weekly, daily, etc.) provides for real time identification of excess material on hand and excess material on order, an opportunity for a manufacturing organization to cancel, push out or reschedule orders to avoid procuring material not required, flexibility and scalability to adjust to requirements planning changes if the organization alters its planning cycle and current period reporting of excess financial data instead of reporting on a previous period (normally, previous month's data).

The number and selection of fields in each record allows users to generate various types of reports, to collect and report data at a significant of level detail. The use of a separate summary inventory table allows reporting access to historic data, reduction in process time for identifying, managing and reporting excess data. This also allows a greater breadth of individuals to have real-time access to data.

The present invention also facilitates automatic calculations performed by the system to determine accruals, systematic identification of movement types to identify accruals and de-accruals for each reporting period, an increase in financial data accuracy based on non-manual calculations and a reduction in tactical activities to determine actual accrual values monthly. The present invention also provides for flexible reporting capabilities on year-to-date obsolescence values, for removal of manual processes for calculating year-to-date obsolescence, for an increase in data accuracy based on system performing automatic calculations to determine obsolescence, for systematic calculation of obsolescence values on an on-going basis, and for flexible reporting capabilities on year-to-date obsolescence values.

DESCRIPTION OF THE PREFERRED EMBODIMENT

Figure 1:
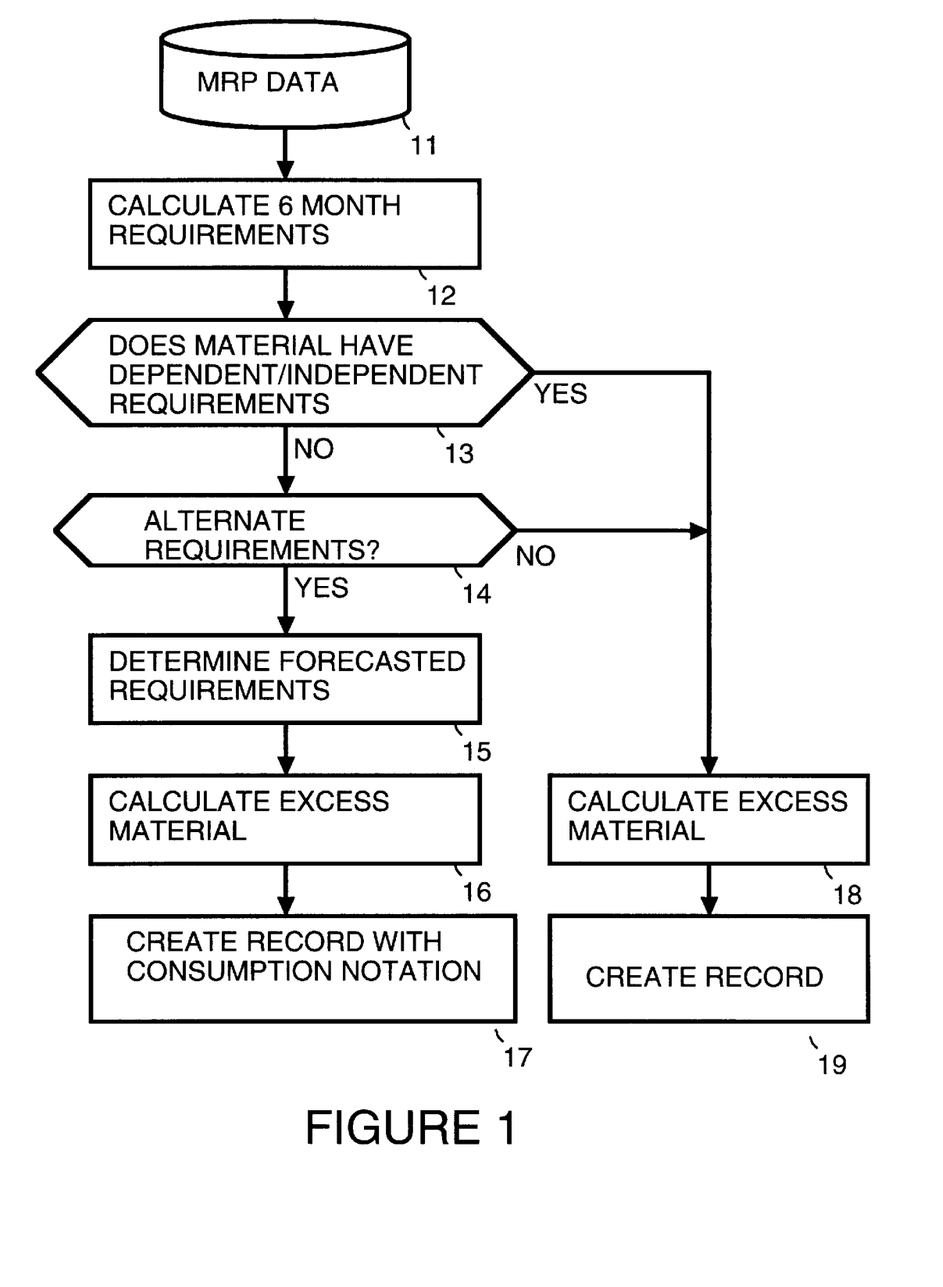
FIG. 1 is a flowchart which summarizes process flow for an excess inventory system in accordance with a preferred embodiment of the present invention.

FIG. 1 is a flowchart which summarizes process flow for an excess inventory system in accordance with a preferred embodiment of the present invention. The flowchart illustrates that in generating records for excess material, multiple planning methods may be used to determine whether material is excess. Notations can then be placed within the records to indicate which planning method was used to calculate the excess material.

In a step 12, the excess inventory system calculates, from material requirements planning (MRP) data 11, six month requirements for each component part. This is done, for example, by adding all dependent and independent requirements for a 6 month period of time to determine the total 6 month requirements for each component part.

In a step 13 a check is made to determine if the material has dependent or independent requirements. A dependent requirement is a customer order for a product. An independent requirement is a forecasted customer order. If no dependent or independent requirements exist, in step 14 the excess inventory system checks to determine whether a particular component part is planned through an alternative method (e.g., manual reorder point, automatic reorder point, forecast based planning). If the excess inventory system determines an alternate planning method is used for a particular component part, in a step 15 the excess inventory system retrieves all forecasted requirements over a 6 month period and estimates the total 6 month material requirements for the component part.

Once the excess inventory system has calculated the exact 6 month requirements or estimated the requirements, the excess inventory system performs a calculation (on hand+on order−6 month requirements) to determine if material purchases exceed material demand for the component part. Any component parts with materials identified as excess have records created in an excess inventory detail table. This is represented in FIG. 1 by steps 18 and 19. Additionally, all component parts using an alternative planning method are "stamped" with a note in the excess inventory system indicating which planning method was used in calculation of excess material. This is represented in FIG. 1 by steps 18 and 19.

Figure 2:
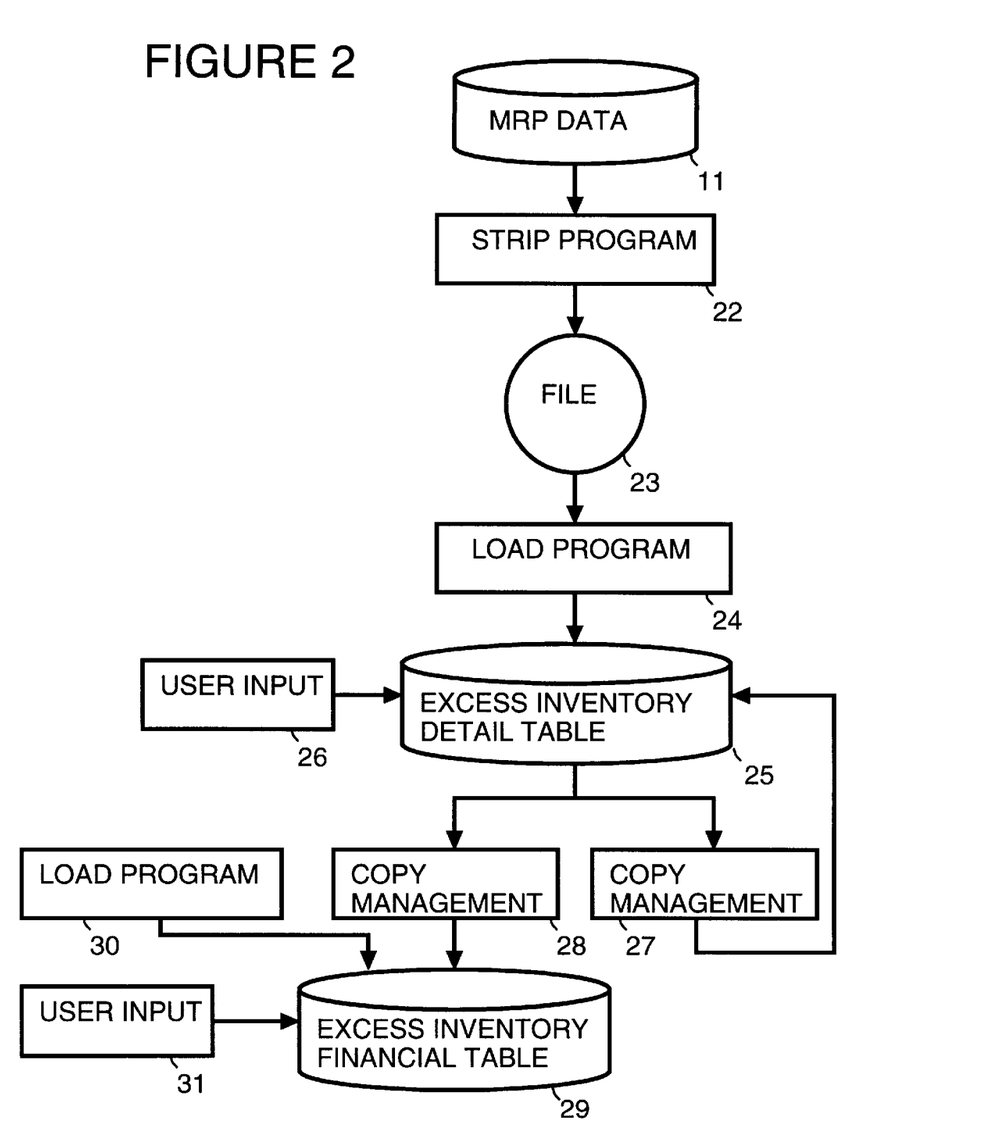
FIG. 2 is a flowchart which shows additional detail of process flow for an excess inventory system in accordance with a preferred embodiment of the present invention.

FIG. 2 provides additional detail about an implementation of the excess inventory system. The excess inventory system provides multiple organizations with the flexibility of determining how often excess data is gathered and available for analysis for each organization.

The excess inventory system includes an excess inventory detail table 25 and a financially summarized excess inventory data table 29.

Excess inventory detail table 25 is populated with records of excess material based on calculations performed by two programs: a strip program 22 and a load program 24. Strip program 22 and load program 24 use predefined calculations to determine that a material is considered in excess of manufacturing needs based on material requirement planning (MRP) data 11. Material requirements planning data 11 is generated using a systematic method of determine material requirement needs over a period of time. For more information on MRP, see Thomas F. Wallace, MRP II, Making it Happen, Wight Limited Publications, 1990.

In the preferred embodiment, requirements are calculated for a minimum of six months for component materials. Once a material is identified as "being in excess" of six month requirements, strip program 22 and load program 24 create a record in excess inventory detail table 25 for that excess material.

Specifically, strip program 22 identifies excess inventory after each generation of MRP data. This information is placed in records within a file 23. Each record within file 23 specifies a material type, an excess quantity, a run date the record was generated by strip program 22 and various other fields with additional information.

Load program 24 uses the information in file 23 to add or update information in excess inventory detail table 25. Typically, after each MRP run, excess inventory detail table 25 updates excess inventory detail table 25.

Table 1 below gives an example of fields for a record within excess inventory detail table 25. Each record gives information about a single component part.

Table 1

Record Fields

1. Current month (actual current month)
2. Division (division used in)
3. Plant (where part being used)
4. MRP controller (identifies person responsible to part)
5. Material number (product code of component part)
6. Exclude code (allows MRP controller to remove material from being excess)
7. Platform (identifies platform that component part is used in)
8. Technology (tells technology, e.g., type of processor)
9. Upgrade (is part upgrade unit, accessory, and so on)
10. Material class (e.g., identifies production, non-production, or subcontracted part)
11. Material category (identifies OEM, IEM, etc.)
12. Total stock (on hand balance)
13. Value of stock
14. Open order quantity
15. Open order value
16. Material part status (part is active or discontinued or obsolete)
17. Six month requirement field
18. Six month requirement value
19. Excess quantity (owned=ordered>6 mo. req.)
20. Excess value
21. Ultimate usage quantity.
22. Ultimate usage date.
23. Exclude quantity (manually entered)
24. Exclude value
25. Original life time buy quantity
26. Lifetime buy revision date (last reviewed)
27. Lifetime buy start date
28. Lifetime buy end date
29. Excess date (date material originally id. as being excess)
30. Last program update (last time program updated record)
31. Date buyer last update (stamped whenever buyer updates record)
32. Excess Cause (buyer can indicate why material is excess.
33. Buyer note 1 (for buyer note to indicate how excess is being handled)
34. Buyer note 2 (for buyer note to indicate how excess is being handled)
35. Buyer note 3 (for buyer note to indicate how excess is being handled)
36. Buyer note 4 (for buyer note to indicate how excess is being handled)
37. Buyer note 5 (for buyer note to indicate how excess is being handled)
38. Disposition Activity (note on how material is being disposed.
39. Analyst note 1 (for analyst note to indicate how excess is being handled)
40. Analyst note 2 (for analyst note to indicate how excess is being handled)
41. Analyst note 3 (for analyst note to indicate how excess is being handled)
42. Analyst note 4 (for analyst note to indicate how excess is being handled)
43. Analyst note 5 (for analyst note to indicate how excess is being handled)

The fields for each record placed within file 23 is similar to the fields for records stored in record within excess inventory detail table 25, except however, that fields 32 through 43 are not included within records placed within file 23.

When updating excess inventory detail table 25, if load program 24 detects that a material record in file 23 is identified as new excess, the material record is loaded into excess inventory detail table 25 with a date equal to the run date of strip program 22. If a material record already exists in excess inventory detail table 25 for the material, but some value has changed, then load program 24 updates the record in excess inventory detail table 25 and a date-updated field is changed to the run date of strip program 22. If a material record already exists in excess inventory detail table 25 and no value has changed, then load program 24 updates only a program date field in the record. If a material record exists in excess inventory detail table 25 but not in file 23, then the material is no longer excess. In this case, load program 24 clears the date for the record for the material. In addition, quantities and value fields within the record for the material are set to zero. In the preferred embodiment, the record for the material still remains in excess inventory detail table 25 for three months after there is no longer any excess.

Certain values are manually placed within fields of a record. For example, the exclude code field allows an MRP controller to remove material from being regarded as excess. This is useful, for example, when a large order is anticipated or for some other reason the supply and/or potential demand for component parts is known to be different than is normally calculated. The various note files allow a buyer or an analyst to place information within the record.

Strip program 22 and load program 24 are scheduled to run after MRP calculations are performed at a manufacturing organization in order to determine excess materials. If a manufacturing organization is running MRP on a weekly basis, the excess inventory system can identify excess materials weekly. If another manufacturing organization is running daily MRP cycles then excess inventory system can identify excess materials daily for that manufacturing organization. Strip program 22 and load program 24 identify excess materials monthly, weekly, daily and even hourly based on how often a material requirements plan is generated.

Copy management module 27 allows records within excess inventory detail table 25 to be carried over from month to month. Copy management module 28 performs a summary roll-up from excess inventory detail table 25 to financially summarized excess inventory data table 29. Additionally Load program 30 is used to add or update information in financially summarized excess inventory data table 29. Financially summarized excess inventory data table 29 can be updated less frequency, for example, at the end of each month.

Table 2 below gives an example of fields for a record within financially summarized excess inventory data table 29. Each record gives information about a platform (or product) which typically uses many component parts.

Table 2

Record Fields

1. Current month
2. Division
3. Plant
4. Platform
5. Material class
6. Material category
7. Total stock
8. Value of stock
9. Excess quantity
10. Excess value
11. Exclude quantity
12. Exclude value
13. Recovery dollars (manually entered)
14. Direct dispositions (system generated)
15. Disposition against accrual
16. Actual accruals (see formula below)
17. YTD obsolescence (see formula below)
18. New accruals (system generated)
19. De-accruals
20. Estimated next month obsolescence (manually updated field)
21. Target obsolescence (manually entered for year)

The flexibility in the frequency at which excess material is identified is advantageous for planning by a manufacturing organization. It allows for real time identification of excess material on hand and excess material on order. It gives manufacturing organization the opportunity to cancel, push out or reschedule orders to avoid procuring material not required. It also provides the flexibility and scalability to adjust to requirements planning changes if the manufacturing organization alters its planning cycle. The flexibility also facilitates current period reporting of excess financial data instead of being limited to reporting on previous period (normally, previous month's data).

All information in excess inventory detail table 25 and financially summarized excess inventory data table 29 is organized in a hierarchical structure with the larger information categories (i.e. current month, plant, MRP controller, material number) supported by smaller tactical data (i.e. excess quantity, open order quantity). User generated reports are provided through a graphical interface which allows individuals to see which smaller data pieces are supporting the higher level data.

For example, if a user is required to generate a report, which identifies all new excess material for that week, the user can enter the selection criteria (normally includes MRP controller, plant and a date range) and execute the on-line query. The excess inventory system generates a real-time display of the information request grouped by a predefined data hierarchy. A user can then select a data element (i.e. current month) to display lower level data (i.e. MRP controller or material number).

A user, such as a material buyer, now can have responsibility for identifying excess material without requiring the assistance of an analyst. A user of the excess inventory system can review excess material using the ad hoc reporting capabilities of excess inventory system and use other features of the excess inventory system to maintain the information in excess inventory system query excess inventory detail table 25 via user input 26 or financially summarized excess inventory data table 29 via user input 31.

Figure 3:
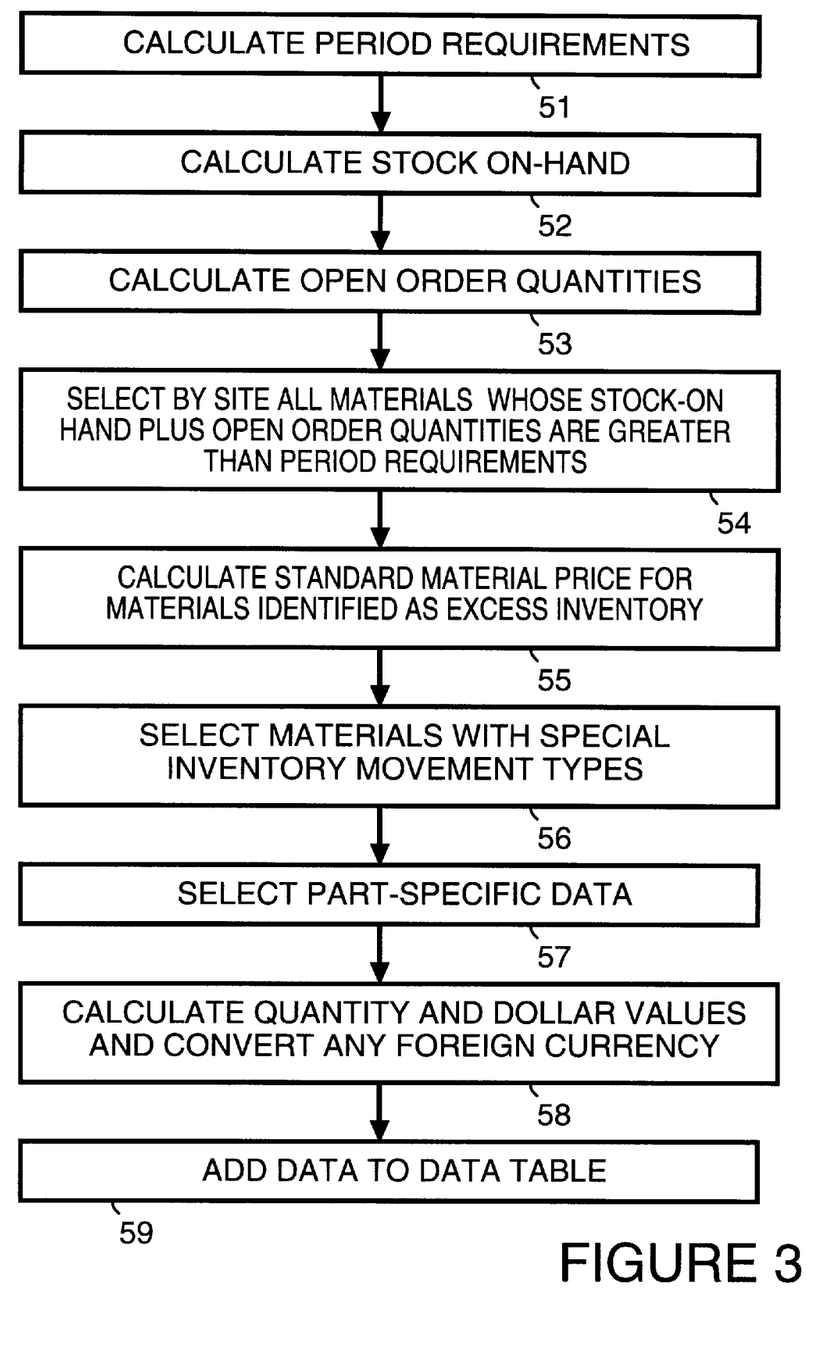
FIG. 3 is a flowchart which shows process flow for a strip module in an excess inventory system in accordance with a preferred embodiment of the present invention.

FIG. 3 is a flow chart which illustrates operation of strip program 22. In a step 51, from MRP data 11, strip program 22 calculates the period requirements for each material type. For example, the period is six months. In a step 52, from MRP data 11, strip program 22 calculates stock on hand for each material type. In a step 53, from MRP data 11, strip program 22 calculates open order quantities for each material type.

In a step 54, strip program 22 selects by manufacturing organization, all material types whose stock on hand plus open order quantities are greater than period requirements. In a step 54, strip program 22 calculates the standard material price for material identified as excess inventory.

In a step 56, strip program 22 selects materials that had stock issued out of the warehouse into a scrap account. This includes materials identified as having excess stock as well as non-excess materials. In a step 57, part specific data is selected. In a step 58, various quantity and dollar values and any currency values is converted to U.S. dollars. In a step 59, the selected data is added to data file 23.

Excess inventory detail table 25 and financially summarized excess inventory data table 29 are populated based on the MRP schedule of each manufacturing organization (noted previously monthly, weekly, daily, hourly).

Figure 4:
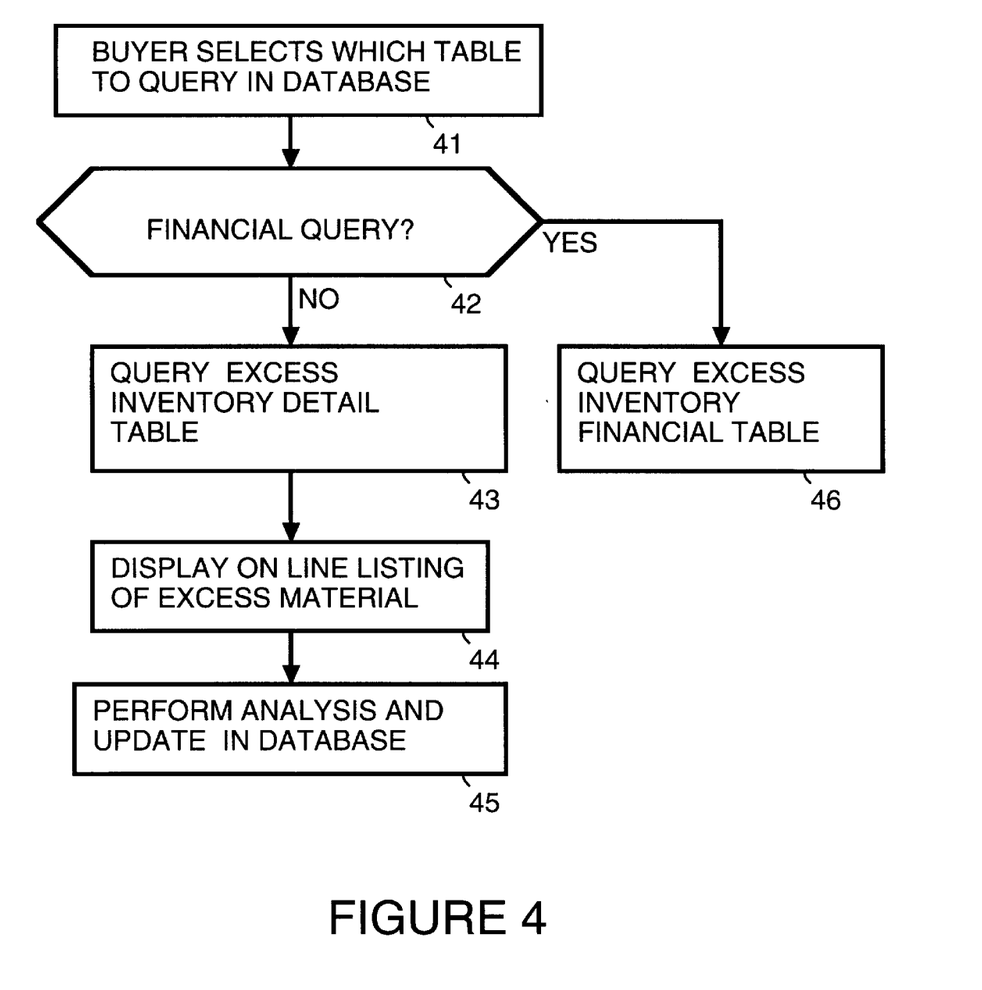
FIG. 4 is a flowchart which illustrates buyer access to information in an excess inventory system in accordance with a preferred embodiment of the present invention.

FIG. 4 illustrates how a user can query the excess inventory system to access various information. In a step 41, the user selects which table to query in the excess inventory system. In a step 42, the excess inventory system determines whether the query is a query into excess inventory detail table 25 or financially summarized excess inventory data table 29. If the query is a query into financially summarized excess inventory data table 29, in a step 46, the query is completed into financially summarized excess inventory data table 29. If the query is a query into excess inventory detail table 25, in a step 43, the query is completed into excess inventory detail table 25. In a step 44, the excess inventory system displays an on-line listing of excess material. In a step 45, the user can perform analysis and updates into excess inventory detail table 25.

Users of excess inventory system query excess inventory detail table 25 or financially summarized excess inventory data table 29 (access to either table is based on security authorization) use on-line reporting query screens (standard or flexible analysis) to gather data based on the criteria entered. The reports generated from excess inventory system are dynamic; such that users are able to "drill down" to analysis what lower level data is driving the higher level information.

In the preferred embodiment of the present invention, it is possible to make a systematic determination of actual accruals of excess inventory over a platform. This is facilitated by the Actual accruals field in a record within financially summarized excess inventory data table 29. In order to generate this value for a product platform, a one time initial load of the year-to-date Actual Accrual value is loaded into the Actual accruals field per division, plant, platform, technology, material class and material category of financially summarized excess inventory data table 29. During each run of strip program 22 and load program 24, all materials that have been removed from stock during the month for the purpose of disposition are identified. These materials are identified based on the inventory movement type that was used which signifies an accrual transaction. The dollar amount of the disposed material is calculated and captured in excess inventory detail table 25 (See the direct disposition field or the disposition against accrual fields). During the monthly roll up of the detail data from excess inventory detail table 25 into financially summarized excess inventory data table 29 the current year-to-date Actual accruals is calculated using Formula 1 below:

((Last Month Actual Accruals+New Accruals)−De-accruals)−Dispositions against Accruals     Formula 1

Users from a finance department are able to review history of this rolling Actual accruals field, per month, as well as detail data of all materials that have been disposed of per month. This allows automatic calculations to be performed by excess inventory system to determine accruals, systematic identification of movement types to be performed by excess inventory system to identify accruals and de-accruals for the month, an increase in financial data accuracy based on non-manual calculations, a reduction in tactical activities to determine actual accrual values monthly and flexible reporting capabilities on year-to-date obsolescence values using excess inventory system's reporting tools.

Also in the preferred embodiment, a one time initial load of the year-to-date (YTD) obsolescence value is loaded into a YTD-obsolescence field per division, plant, platform, technology, material class and material category of the finance summary table.

During each run of strip program 22 and load program 24, all materials that have been removed from stock during the month for the purpose of disposition are identified. These materials are identified based on the inventory movement type that signifies a non-accrued transaction. The dollar amount of the disposed material is calculated and captured in excess inventory detail table 25 (See the direct disposition field or the disposition against accrual fields). During the monthly roll up of the detail data from excess inventory detail table 25 into financially summarized excess inventory data table 29 the current YTD obsolescence value is calculated using the following Formula 2:

((Last Month YTD obsolescence+Actual Accruals)−De-accruals)−Direct Dispositions−Recovery Dollars     Formula 2

Users from a finance department are able to review history of this rolling YTD obsolescence field per month, as well as detail data of all materials that have been disposed of per month. This feature replaces the manual process for calculating year-to-date obsolescence. It also provides for an increase in data accuracy based on system performing automatic calculations to determine obsolescence, systematic calculation of obsolescence values on an on-going basis, and flexible reporting capabilities on year-to-date obsolescence values using excess inventory system's reporting tools.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for monitoring excess inventory for a component part, the method allowing flexibility in choosing a methodology for performing forecasting, and the method comprising the following steps:
   (a) determining requirements for the component part over a predetermined period from material requirements planning (MRP) data;
   (b) when forecasting for the component part is to be determined using an MRP planning method, performing the following substeps:
      (b.1) determining, from the MRP data, a number of excess components parts, and
      (b.2) recording the number of excess components in a record for the component part within an excess inventory table; and,
   (c) when forecasting for the component part is to be determined using an alternate planning method which is alternate to MRP, performing the following substeps:
      (c.1) determining, from the alternate planning method, a number of excess component parts, and
      (c.2) recording, in the record for the component part within the excess inventory table, the number of excess components and a notation indicating the alternate planning method used.

2. A method as in claim 1 wherein in substep (b.1) the number of excess component parts is determined using the following formula:

excess component parts=number of component parts on hand +number of component parts on order−requirements for the component part over the predetermined period.

3. A method as in claim 1 wherein steps (a) through (c) are scheduled to be performed periodically after the performance of an MRP cycle.

4. A method as in claim 3 wherein steps (a) through (c) are scheduled to be performed periodically over one of the following periods:
   hourly;
   daily;
   weekly; and
   monthly.

5. A method as in claim 1 wherein in substep (b.2) includes, in response to an exclusion value entered by a user, excluding a certain amount of component parts from being regarded as excess.

6. A method for monitoring excess inventory for a component part comprising the following steps:
   (a) determining requirements for the component part over a predetermined period from material requirements planning (MRP) data;

(b) when forecasting for the component part is to be determined using an MRP planning method, performing the following substeps:
  (b.1) determining, from the MRP data, a number of excess component parts, and
  (b.2) recording the number of excess components in a record for the component part within an excess inventory table;
(c) when forecasting for the component part is to be determined using an alternate planning method which is alternate to MRP, performing the following substeps:
  (c.1) determining, from the alternate planning method, a number of excess component parts, and
  (c.2) recording, in the record for the component part within the excess inventory table, the number of excess components and a notation indicating the alternate planning method used; and,
(d) summarizing information in the excess inventory table and placing the summarized information into a summarized excess inventory table, the summarized excess inventory table including a record for a platform product which includes the component part.

7. A method as in claim 6 wherein step (d) includes the following substep:
  (d.1) maintaining actual accruals for excess materials for the platform product.

8. A method as in claim 7 wherein substep (d.1) includes performing the following calculation to calculate current actual accruals:

current actual accruals=((last period actual accruals+new accruals)−de-accruals)−dispositions against accruals.

9. A method as in claim 6 wherein step (d) includes the following substep:
  (d.1) maintaining year-to-date (YTD) obsolescence value for excess materials for the platform product.

10. A method as in claim 9 wherein substep (d.1) includes performing the following calculation to calculate the YTD obsolescence value for excess materials for the platform product:

YTD obsolescence value=((last period YTD obsolescence value +actual accruals)−de-accruals)−direct dispositions−recovery dollars.

11. A method for monitoring excess inventory comprising the following steps:
  (a) determining requirements for material over a predetermined period from material requirements planning (MRP) data;
  (b) recording the number of excess material within an excess inventory table, the excess inventory table including a record for each component part for which there is excess; and,
  (c) summarizing information in the excess inventory table and placing the summarized information into a summarized excess inventory table, the summarized excess inventory table including a record for a platform product which includes component parts for which there is excess, including the following substep:
    (c.1) maintaining actual accruals for excess materials for the platform product.

12. A method as in claim 11 wherein substep (c.1) includes performing the following calculation to calculate current actual accruals:

current actual accruals=((last period actual accruals+new accruals)−de-accruals)−dispositions against accruals.

13. A method for monitoring excess inventory comprising the following steps:
  (a) determining requirements for material over a predetermined period from material requirements planning (MRP) data;
  (b) recording the number of excess material within an excess inventory table, the excess inventory table including a record for each component part for which there is excess; and,
  (c) summarizing information in the excess inventory table and placing the summarized information into a summarized excess inventory table, the summarized excess inventory table including a record for a platform product which includes component parts for which there is excess, including the following substep:
    (c.1) maintaining year-to-date (YTD) obsolescence value for excess materials for the platform product.

14. A method as in claim 13 wherein substep (c.1) includes performing the following calculation to calculate the YTD obsolescence value for excess materials for the platform product:

YTD obsolescence value=((last period YTD obsolescence value +actual accruals)−de-accruals)−direct dispositions−recovery dollars.

15. An excess inventory monitoring system, comprising:
  an excess inventory table, containing records which track excess material;
  a strip program which determines, from material requirements planning (MRP) data, requirements for a component part over a predetermined period and a number of excess component parts; and
  a load program for recording the number of excess components in a record for the component part within the excess inventory table;
  wherein when forecasting for the component part is to be determined using an MRP planning method, the number of excess component parts is determined from the MRP data; and,
  wherein when forecasting for the component part is to be determined using an alternate planning method which is alternate to MRP, the number of excess component parts is determined from the alternate planning method and a notation indicating the alternate planning method used is placed in the record.

16. An excess inventory monitoring system as in claim 15 wherein when forecasting for the component part is to be determined using an MRP planning inventory monitoring system, the number of excess component parts is determined using the following formula:

excess component parts=number of component parts on hand +number of component parts on order−requirements for the component part over the predetermined period.

17. An excess inventory monitoring system as in claim 15 wherein the excess inventory monitoring system, in response to an exclusion value entered by a user, excludes a certain amount of component parts from being regarded as excess.

18. An excess inventory monitoring system as in claim 15 additionally comprising:
  a summarized excess inventory table into which is placed summarized information from the excess inventory table, the summarized excess inventory table including a summarized record for a platform product which includes the component part.

19. An excess inventory monitoring system as in claim 18 the summarized record includes a field for maintaining actual accruals for excess materials for the platform product.

20. An excess inventory monitoring system as in claim 19 wherein the actual accruals for excess materials for the platform product is calculated as below:

> current actual accruals=((last period actual accruals+new accruals)−de-accruals)−dispositions against accruals.

21. An excess inventory monitoring system as in claim 18 the summarized record includes a field for maintaining year-to-date (YTD) obsolescence value for excess materials for the platform product.

22. An excess inventory monitoring system as in claim 21 wherein the YTD obsolescence value for excess materials for the platform product is calculated as below:

> YTD obsolescence value=((last period YTD obsolescence value +actual accruals)−de-accruals)−direct dispositions−recovery dollars.

* * * * *